US011428596B2

(12) United States Patent
Huang et al.

(10) Patent No.: US 11,428,596 B2
(45) Date of Patent: Aug. 30, 2022

(54) VACUUM GAUGE WITH AN EXTENDED DYNAMIC MEASUREMENT RANGE

(71) Applicants: Liji Huang, Santa Clara, CA (US);
Chih-Chang Chen, Cupertino, CA (US)

(72) Inventors: Liji Huang, Santa Clara, CA (US);
Chih-Chang Chen, Cupertino, CA (US)

(73) Assignee: Wisenstech Ltd., Santa Clara, CA (US)

( * ) Notice: Subject to any disclaimer, the term of this patent is extended or adjusted under 35 U.S.C. 154(b) by 118 days.

(21) Appl. No.: 17/022,988

(22) Filed: Sep. 16, 2020

(65) Prior Publication Data

US 2022/0082466 A1    Mar. 17, 2022

(51) Int. Cl.
*G01L 21/12*    (2006.01)

(52) U.S. Cl.
CPC .................. *G01L 21/12* (2013.01)

(58) Field of Classification Search
CPC ......... G01L 21/00; G01L 21/30; G01L 21/10; G01L 21/14; G01L 27/005; G01L 21/04; G01L 19/04; G01L 9/0072; G01L 19/06; G01L 9/0073; G01L 9/12; G01L 27/007; G01L 9/00; G01L 9/008; G01L 21/22; G01L 27/00; G01L 27/002; G01L 19/0092; G01L 21/02; G01L 21/16; G01L 7/18; G01L 9/007; G01L 21/24; G01L 19/02; G01L 19/14; G01L 9/0022; G01L 19/142; G01L 19/147; G01L 19/16; G01L 7/04; G01L 15/00; G01L 19/08; G01L 11/002; G01L 19/00; G01L 19/0015; G01L 19/0627; G01L 21/06; G01L 19/0007; G01L 19/12; G01L 7/00; G01L 7/182; G01L 9/0042; G01L 9/0091; G01L 13/025; G01L 19/0636; G01L 19/086; G01L 7/041; G01L 7/16; G01L 9/0075; G01L 9/125; G01L 1/144; G01L 19/0061; G01L 19/0609; G01L 23/125; G01L 27/02; G01L 7/022; G01L 7/12; G01L 7/20; G01L 9/0002; G01L 9/0076; G01L 9/0092; G01L 1/02; G01L 11/00; G01L 13/02;

(Continued)

(56) References Cited

U.S. PATENT DOCUMENTS

| | | | | |
|---|---|---|---|---|
| 2001/0011890 A1* | 8/2001 | Kawasaki | ............... | H01J 41/02 324/460 |
| 2014/0216127 A1* | 8/2014 | Kimura | ..................... | G01L 9/04 73/1.57 |
| 2015/0276536 A1* | 10/2015 | Gu | ........................ | G01L 21/10 216/13 |

FOREIGN PATENT DOCUMENTS

| | | | | |
|---|---|---|---|---|
| CA | 3007375 A1 * | 12/2018 | ............. | G01L 21/12 |
| CN | 109075010 B * | 9/2020 | ............. | G01L 21/32 |

(Continued)

*Primary Examiner* — Andre J Allen (57) ABSTRACT

The design of a vacuum gauge utilizing a micromachined silicon vacuum sensor to measure the extended vacuum range from ambient to ultrahigh vacuum by registering the gas thermal properties at each vacuum range is disclosed in the present invention. This single device is capable of measuring the pressure range from ambient and above to ultrahigh vacuum. This device applies to all types of vacuum measurement where no medium attack silicon is present. The disclosed vacuum gauge operates with thermistors and thermopile on a membrane of the thermal isolation diaphragm structure with a heat isolation cavity underneath.

9 Claims, 5 Drawing Sheets

(58) Field of Classification Search
CPC ..... G01L 19/0618; G01L 19/10; G01L 21/08;
G01L 25/00; G01L 3/26; G01L 7/043;
G01L 7/063; G01L 7/065; G01L 7/08;
G01L 7/082; G01L 7/084; G01L 7/24;
G01L 9/0005; G01L 9/0047; G01L
9/0048; G01L 9/0054
USPC .................................................. 73/700–756
See application file for complete search history.

(56) References Cited

FOREIGN PATENT DOCUMENTS

| | | | | |
|---|---|---|---|---|
| EP | 1890124 A1 | * | 2/2008 | ............. G01L 21/32 |
| KR | 20030088089 A | * | 11/2003 | |

* cited by examiner

VACUUM GAUGE WITH AN EXTENDED DYNAMIC MEASUREMENT RANGE

BACKGROUND OF THE INVENTION

1. Field of the Invention

This invention relates to micromachined silicon sensors or Micro Electro Mechanical Systems (MEMS) pressure sensing technology that measures the relative pressures, particularly for vacuum applications. This invention additionally provides the design and make of a micromachined vacuum sensor using the thermal time-of-flight sensing principle.

2. Description of the Related Art

Vacuum sensor is one of the common pressure sensing devices in multiple disciplines. A few of the current technologies for vacuum measurements all suffer a small dynamic range, low accuracy, and gas composition dependency. Therefore, for high vacuum applications, multiple vacuum sensors with different measurement principles have to be used to meet the requirements. In the low vacuum ranges that cover from ambient to $10^{-3}$ Torr, the "Pirani" (e.g., Matunaga, Y. Vacuum gauge, U.S. Pat. No. 1,768,415, Jun. 24, 1930), Mcleod (e.g., Partzsch, A., Vacuum Gauge, U.S. Pat. No. 1,508,242, Sep. 9, 1924) or capacitance vacuum gauge (e.g., Miyashita, H., Electrostatic capacitance diaphragm vacuum gauge and vacuum processing apparatus, U.S. Pat. No. 7,841,239, Nov. 30, 2010) is applied while at the higher vacuum ion gauges (e.g. Ottinger, O. H. Thermionic ionization vacuum gauge, U.S. Pat. No. 2,790,949, Apr. 30, 1957; Kuster, G., Penning type gauge head with ignition aid, U.S. Pat. No. 5,923,172, Jul. 13, 1999) are used. Because the Mcleod gauge is purely mechanical and has safety-related matter, while the capacitance vacuum gauge requires a complicated compensation scheme, the simply constructed Pirani gauge is widely used for low vacuum. The Pirani gauge is originated for more than one century, which utilizes the physical phenomenon that when gas molecules collide with a heated metal wire, there will be heat transfer or the thermal conductivity measured via the metal wire will change with the variations of the vacuum. However, when the vacuum is getting higher or the pressure is getting lower, the gas density will be lower or the number of the molecule in a fixed volume will be smaller. This will result in a reduction of the collision probability between the molecule and the metal wire, or an increase of the mean free path of the molecule, leading to the significant decade in the measurement capability. And the higher vacuum or lower pressure will then require a gauge with different measurement principles. Ion gauge is the current selection for high vacuum, but ion gauges require high voltage and are costly. In addition, the vacuum pressure deduced from the thermal conductivity is gas medium dependent as different gases will have different thermal conductivities. This will add complexity in the vacuum gauge calibration based on this measurement principle, or in the actual applications where the measurement environment may have mixed gases, the measurement uncertainties would be very high.

There are several disclosures over the century to improve the performance of the vacuum gauges. The miro-Pirani vacuum sensor is also proposed by Kvisteroy (Kvisteroy T. and Jakobsen H., Vacuum sensor, U.S. Pat. No. 8,449,177, May 28, 2013) where the hot-wire is placed on a thermally isolated layer and a cavity for the measurement best as a bolometer. Gu (Gu, L., Bart, S. F, and Wenzel, O., Micro-Pirani vacuum gauge, U.S. Pat. No. 9,335,231, May 10, 2016) utilizes the MEMS technology to fabricate a wider ranged micro-Pirani sensor for which the key is to have a well thermally isolated structure on which the measurement hot-wires is placed on a cavity supported by a membrane on which an additional significantly smaller thermal conductivity layer was made beneath the hot-wire for better thermal isolation and the effects due to thermal convection could be reduced. A capped heat sink is further placed on top of the hot-wires such that the distance or gap between the cap wall and the hot-wire could be contained for the molecule mean free path which will help to boost the measurement sensitivity. With such a structure, the disclosure claims a lowest detectable vacuum of $10^{-6}$ Torr, which is slightly more than two orders of magnitudes better than traditional Pirani sensors. The requirement for significantly thermally mismatched materials for isolation complicated the manufacturing process as the stress mismatch may lead to long term reliability. The small-cap is also an additional cost to the manufacture as a wafer bonding process will be involved. In addition, these improvements did not remove the gas property dependent character of the Pirani sensor.

Bonne (Bonne, U., Absolute pressure sensor and method, U.S. Pat. No. 5,303,167, Apr. 12, 1994) teaches a dual thermal microbridge based absolute gas pressure sensor that utilizes a micromachined dual membrane structure to acquire the thermal conductivity and thermal capacitance data via the inferential calculation. The detail of the calculation is not disclosed but using these acquired gas thermal properties for correction, the claimed gas independent measurement of the vacuum pressure can be down to $10^{-3}$ Torr. As the results will be dependent on numerical regression and inferential calculations, the achievable accuracy is unknown and the signal process complicated the device making. The complicated measurement and calculation scheme will certainly lead to a slow response to the vacuum changes, which is not ideal for vacuum control applications. Also, the highest vacuum that can be measured is still not satisfactory for many of the vacuum applications.

In the vacuum applications, such as high-quality thin film deposition or semiconductor integrated circuitry making, a vacuum of low $10^{-7}$ Torr is required, and often the processing gases would have a complicated gas mixture which leads to large measurement errors of the current vacuum gauge. The process control of the vacuum is critical for the manufacturing efficiency as well as for many analytical instruments where the correct vacuum is a must for triggering the due process. The current dual-sensor vacuum gauge with the different measurement principles is therefore undesired, and sometimes the abrupt transition also complicated the control process, consequently, the process control could be significantly delayed.

SUMMARY OF THE INVENTION

It is therefore desired to provide the design of the vacuum sensor and the assembly of a vacuum gauge that will be able to achieve the high accurate vacuum measurement in a large dynamic range with a single sensing scheme, and without being the needs of using multiple sensors with different sensing principles that will be beneficial for the controlling of vacuum pumps and enhancing the pumping efficiency. The vacuum pressure sensor will further be able to measure the vacuum pressure that is independent of the gas compositions. The vacuum pressure sensor will be preferred to be the miniature size and will have the capability to operate in a low power mode such that it can be powered by a battery and applied for many portable applications such as compressor inspection. It will also be able to have a large dynamic range and high sensitivity with a fast response that will ensure the process stability and repeatability. Such vacuum pressure sensor will also be easily manufactured.

It is an object of the present invention to employ the combined thermal measurement principle such that the large dynamic ranges of the vacuum pressure sensing can be achieved as desired. For the vacuum pressure sensors, the thermal time-of-flight sensing will sense the thermal conductivity and thermal convection, while thermal radiation will be measured at ultrahigh vacuum regime. This is compared to the existing miniaturized vacuum sensors that only measure thermal conductivity. This thermal conductivity based Pirani vacuum sensors dramatically lose their detection capability with the pressure reduction from the ambient to low vacuum ranges. The detailed design of the sensing elements can be found in FIG. 1. The disclosed sensor has the thermistors including the microheater are fabricated on a thermally isolated membrane of the diaphragm structure where the additional thermal isolation is done with the open slits on the membranes. The addition of the detection in the time domain allows that the sensor can even measure the pressure changes above ambient where the thermal conductivity has null variations but the measurement of the convection will enable the sensor to respond to the changes in pressure or the changes in gas density. When the pressure is reduced from ambient towards a low vacuum, the thermal conductivity will be dramatically reduced and it will dominate the measurement scheme. However, when the vacuum pressure reaches low $10^{-3}$ Torr, thermal conductivity responses to the pressure changes will approach null as limited availability of gas molecules. However, thermal convection would be still present with the adjustment of the power of the microheater. At the ultra-high vacuum range, thermal convection would be hardly detectable but thermal radiation will be present and it will also change with the vacuum pressure. The gas-dependent of the thermal measurement can be removed during the measurement by changing the driving frequencies which will operate for the same measurement principle but will generate different amplitude values as well as time-of-flight data that can be used to deduce the thermal properties of a specific gas (thermal conductivity and thermal capacitance) and then these values can be a reference back to the calibration gas properties to having the gas-dependent parameters canceled out. Alternatively, such as for the thermal conductivity measurement, two thermistors can be heated simultaneously but at a different temperature and the ratio of these measurements from these two thermistors can also be used to remove the gas-dependent measurement parameters.

It is another object of the present invention that the sensor can be fabricated on the silicon substrate on which a thermistor is used as a microheater and at least two other thermistors as the temperature sensing elements with a preferred one to be a thermopile. The thermistors used as the microheaters will be placed on a suspended membrane with the open slits at each side of the thermistor for the additional and best thermal isolation. The microheater or microheaters can be used for thermal conductivity measurement, and the other two thermistors can be used for measurement of the thermal convection with a thermally modulated micro-heat source from the microheater. The thermistor of the thermopile can be used to measure the thermal radiation and it will be placed at the closest proximity to the micro-heater. To assist the measurement of the thermal radiation, the microheater, and the thermopile will not have any open slits. Therefore, the present invention of a vacuum pressure sensor with the integrated thermal sensing elements will result in highly sensitive vacuum pressure measurement with a large dynamic range and the disclosed micromachined sensor structure will make the final product easy for manufacture.

It is another object of the present invention that the vacuum pressure sensor with the integrated thermal sensing elements will have the thermistors for measurement of the thermal convection are with a plural number to canceling out the offset instability as well as for gas thermal property measurements. The thermopile may not be in a pair but it will be placed at the proximity to the microheater as close as possible for the measurement of the thermal radiation. The microheater and the thermistors as well as the other sensing elements will be preferred to be isolated with open slits for the best possible thermal isolation, but a continued membrane is preferred between the micro-heater and the thermopile when radiation is measured.

It is another object of the present invention that the vacuum pressure sensor with the integrated thermal sensing elements will be independent of any medium composition. In the approach, the thermal time-of-flight sensing principle will be preferred. With this approach, two thermistors placed on the downstream of the microheater will be used to register the thermal convection and the two respective distances of these two thermistors to the microheater are preferred not to be having the integer ratio. The microheater will be sending a modulated heatwave. Therefore, the thermal conductivity and thermal capacitance can be measured by deducing and solving the heat convection from the two individual measurements by the two independent sensing thermistors. Alternatively, the heatwave generated by the microheater can have multiple frequencies, and the two sensing thermistors will register the data from each frequency that can be further used to deducing the thermal conductivity and thermal capacitance. Thereafter, the measured thermal conductivity and thermal capacitance can be referenced back to the calibration conditions and the gas independent measurement of the vacuum pressure can be achieved.

It is a further object of the present invention to utilize platinum or nickel or doped polysilicon but preferably platinum as the thermistor material for both the microheater and the sensing elements. The thermopile is preferred to be made of doped polysilicon. While the microheater next to the thermopile is preferred to be made of tungsten. Other materials such as magnesium oxide can also be used but either the platinum or doped polysilicon are the best of choice for cost control and easy integration and easy manufacture purposes. The platinum can be made via e-beam evaporation or physical vapor deposition (PVD) while the doped polysilicon can be made with low-pressure chemical vapor deposition (LPCVD) or PVD.

It is yet another object of the present invention to utilize silicon nitride as the supporting membrane materials as well as the surface passivation layers for the thermistors. For the benefit of contaminant proof, the thermistors on the membrane are desired to be fabricated towards the thermal isolation cavity such that the sensitivity of the sensing elements will not be altered due to surface deposits from the medium. And another surface passivation layer with a thermally conductive monomer or polymers will be grown on the top surface of the silicon nitride passivation layer to terminate the pinholes or the free dangling chemical bonds.

It is yet another object of the present invention to fabricate the sensor to create a diaphragm structure on silicon or other similar wafer materials such that a cavity beneath the sensing materials could be easily manufactured for maximum thermal isolation and to provide the consistency for the vacuum pressure measurement. This structure shall further beneficial to the reduction of the response time as the thermal equilibrium will be much easier to be established.

It is an additional object to employ the state-of-the-art MEMS process technology and thin film deposition technology to manage the stress release and build in the microsensor structure such that to ensure the long term reliability of the sensors. The process of the silicon nitride shall be preferably manufactured to a low-stress formality and a balance of the materials in form of compressed stress shall be managed.

It is another object of the present invention to have the special package technology that will not allow material out-gassing of the inner chamber direct to measurement space. The space that hosts the vacuum pressure sensor will be as small as possible to contain the molecular traveling path at the high and ultra-high vacuum range. The sensor will also be placed in a space that is nearly two dimensional with only one exit. The direction of the sensor in the placement will allow the thermal convection measurement has its highest sensitivity.

Other objects, features, and advantages of the present invention will become apparent to those skilled in the art through the present disclosures detailed herein wherein like numerals refer to like elements.

DETAILED DESCRIPTION OF THE PREFERRED EMBODIMENTS

Figure 1:
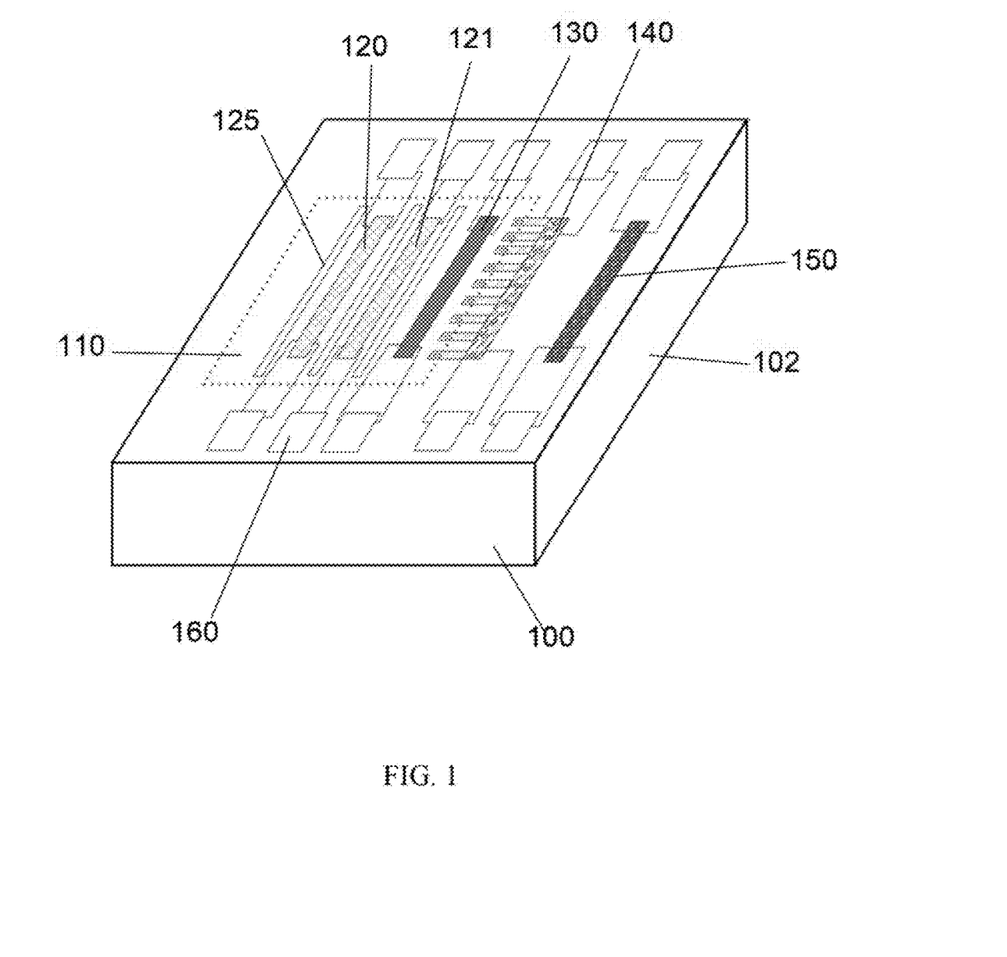
FIG. 1 is showing the configuration of the vacuum pressure sensor with its sensing elements on a membrane.

The preferred making of the vacuum sensor (100) with an extended dynamic range is shown in FIG. 1. The sensor consists of thermally isolated thermistors and a thermopile sensor for the extended pressure range from above ambient down to ultra-high vacuum. It measures the pressure above ambient by utilizing the thermal time-of-flight principle that registers the pressure value via the combined thermal transfer and thermal response at a specific pressure value or gas density, for the pressure down from ambient to low vacuum the thermal conductivity measurement plays the central role. In the range of low to high vacuum, the combined thermal conductivity and thermal convection will contribute to the measurement. And at ultra-high vacuum, the vacuum measurement will be realized by the measurement of thermal radiation at a different gas density. The package of the sensor will also be critical to the sensitivity in the full extended dynamic range with the single sensor chip.

For the making of the sensor, the silicon micromachining process is preferred and the configuration is shown in FIG. 1. On the silicon substrate (102), beneath the membrane (110) is the cavity in which the silicon bulk material is removed from the backside via the standard MEMS deep dry plasma ion etching. The cavity filled with the air or gas provides the best thermal isolation for the thermistors deposited on the membrane. To ensure the flatness of the membrane, which is critical for the time-of-flight measurement, the membrane is either made of low-stress silicon nitride or a multilayer of silicon nitride and silicon dioxide such that the stress shall not play a role in the performance. In most cases, the membrane thickness is controlled within 1.5 micrometers for the commercially available process receipts. However, for the robustness, the membrane can also be made thicker such that the impact of the abrupt changes in pressure would not lead to any fracture-related failures. It is also important for selecting the materials for the membrane with a high thermal conductivity property such that it can assist the measurement when the thermal radiation will become the dominant factor.

The thermistor (120) is preferably made with electronic-beam evaporation of metal ingots such as platinum, nickel, copper, tungsten, and other stable metal materials with large thermal conductivity but preferably platinum for its stability and process uniformity. The membrane around this thermistor (120) will be patterned and dry-etched to have open windows (125) next to both sides of this thermistor. This window connects the upper and lower space of the silicon sensing chip which is divided by the membrane. These open windows not only provide the best thermal isolation for the thermistor but they also serve as the balancer for the membrane to keep its flatness under pressure as the open window allows the fast exchange of the gas under different pressure. This thermistor is then will be used for the measurement of the thermal conductivity changes of the gases due to the change of vacuum. The thermistor is applied with the external power and it is preferred that the thermistor will be powered with the constant power mode such that it will be easier for temperature correction. The measurement of the vacuum via the thermal conductivity is gas-dependent since the thermal conductivity value is different for different gas. In practice, the vacuum sensor is calculated only against one type of gas which is normally air. To eliminate the gas-dependent measurement of the thermal conductivity, a dual thermistor (121) is displaced next to the first thermistor (120) and both thermistors are thermally isolated with the open windows. The second thermistor will be powered simultaneously but at a different value. The second thermistor will output the thermal conductivity as well as a modulated receiving signal from the first thermistor. These three measurements or parameters can then be used to derive the gas independent vacuum value by the diffusivity and thermal conductivity as well as thermal capacity data.

The vacuum measured via the thermal conductivity will theoretically become nullified for pressure at ambient and above as the thermal conductivity will then turn into a constant. Most of the commercially available vacuum gauges utilize this measurement principle (the Pirani gauge) can only start to measure at about 20 Torr. To measure the pressure at ambient and above, the thermistor (120) and (121) are running at the time-of-flight mode that a modulated heatwave is applied to the thermistor (121) and the time differences of the heat transfer recorded at the thermistor (120) is a direct measure of the thermal diffusivity which is governed by the thermal conductivity, specific heat, and the density of the gas. Since thermal conductivity and specific heat will not change at the low positive pressure regime above the ambient, the measurement will be a direct measure of the gas density which is proportional to the gas pressure. With this scheme, a measure of the pressure to 800 kPa can be realized by the disclosed method.

The minimal vacuum can be measured by thermal conductivity is also limited at the lower end when the gas density is reduced to a level where the data corresponding to the changes in thermal conductivity is no longer meaningful, which is normally at a vacuum close to 1 mTorr. However, in a defined space, the reduction of the vacuum is realized via pumping away the enclosed gas, therefore the gas mobility at any place of the defined space will not be stationary. The speed of the gas leaving the defined space will generate a mass flow that has a direct impact on the thermal convection. The convection is then measured via the temperature differences between the thermistors on the sensor chip (100). In this regime, the thermal property of a particular gas would not play a significant role such as the thermal conductivity is no longer measurable. Hence, gas dependence would not contribute to the uncertainties to the measurement. The thermal time-of-flight measurement will be preferred using the thermistors (120) and (121). With the modulated heatwave, the heat convection plus the mass flow can be measured, and both of these data can be directly correlated to the vacuum at the defined and enclosed space. The measured value can then be correlated to the vacuum level of the defined space. This measurement can extend the dynamic range of the vacuum sensor to register the vacuum to as high as $10^{-8}$ Torr if the sensing element is being placed in a very confined space where the dimension is significantly smaller than the mean free path of the enclosed gas.

When the vacuum level of the defined space reaches to the ultrahigh vacuum regime, the gas mobility assisted thermal convection will also be difficult to detect as the amount of molecule that could contribute to the signal are extremely limited. However, thermal radiation will be the major player for the thermal transfer. The thermal radiation is also a function of the vacuum as the transfer is a direct measure of the number of molecules available. The combined thermistor (130) and the thermopile (140) on the sensor chip (100) will be used for this purpose. Unlike the other thermistors, the thermistor (130) will not have an open window next to it for thermal isolation. Instead, it is designed to be in the closet proximity to the thermopile (140) for the highest sensitivity. The distance between the thermistor (130) and thermopile (140) is desired to be within sub-10 μm and preferred within 3 μm. The material that is used to make the thermistor (130) is preferred to be those with high thermal emissivity, such as tungsten. The temperature changes measured by the thermopile (140) will be used to correlate the vacuum level in the ultrahigh vacuum regime from $10^{-8}$ Torr and higher vacuum values. To reduce the background thermal transfer noises, the thermistor will be operated at the two-stage power relay such that the background transfer can be canceled to gain the true effects due to the vacuum changes. The thermistor (150) is designed to measure the sensor chip silicon substrate temperature such that it can provide feedback to the thermistors (120, 121, and 130) for achieving a true constant power or constant temperature mode within the electrical control circuitry. Finally, connection pads (160) for each thermistor and the thermopile provide the interface between the sensor chip and the control electrical circuitry via a wire bonding process.

Figure 2:
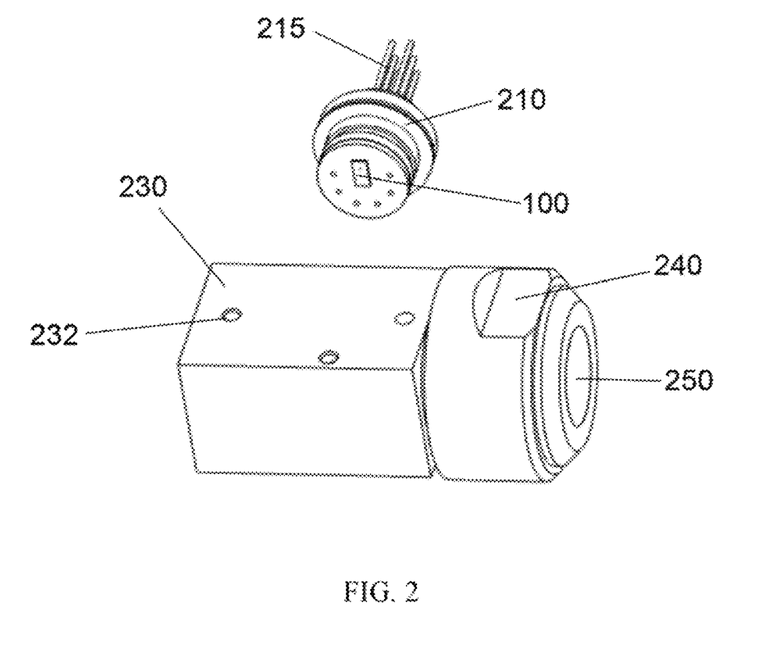
FIG. 2 shows the package of the vacuum pressure sensor and the sensor house.
Figure 3:
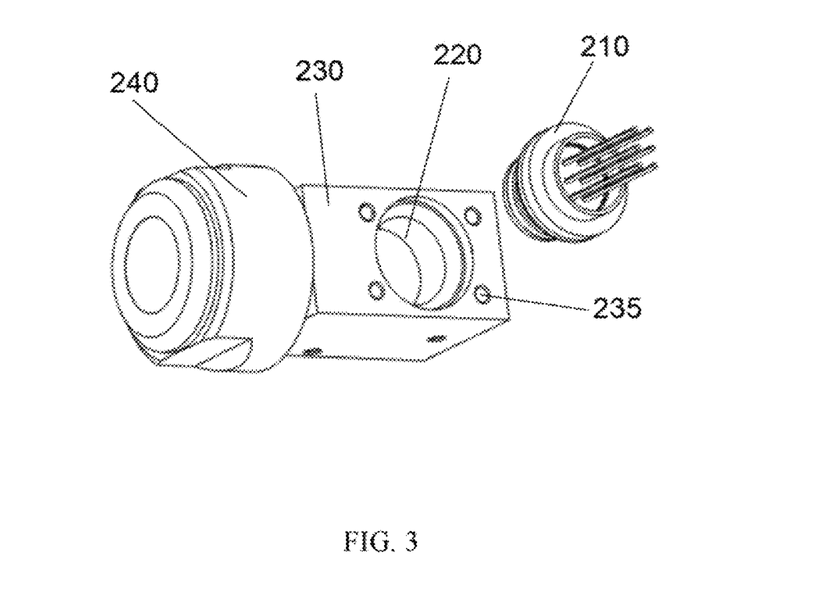
FIG. 3 shows the package of the vacuum pressure sensor and the sensor house from rotation of view angle.

The package to host the vacuum sensor for measurement will also be critical for achieving the desired extended rangeability. This is particularly important at the high and ultrahigh vacuum regime when the molecule's mean free path becomes longer and longer which reduces the possibility of the molecular interactions for thermal transfer and suppresses the signal output. In addition, to ensure the vacuum pumping efficiency, the desired package is required to eliminate any possibility of outgassing. FIG. 2 show the disclosed package of the vacuum sensor for a vacuum gauge. The vacuum sensor (100) is placed on the feedthrough (210) on which the sensor is connected via wire bonding to the external connector (215). The feedthrough is preferred to be made with stainless steel with high-temperature glass or ceramic sealing at the interface such that outgassing can be prevented. The vacuum sensor assembly body (230) is preferred to be made of stainless steel with the sensor assembly feedthrough housing port (220) which is also the opening to the vacuum sensing measurement chamber. The threaded ports (235) in FIG. 3 are for screws to fix the feedthrough (210) to the assembly body (235). The connector (240) is also preferred to be made of stainless steel and it provides an adapter option for various gauge port connections via the channel entrance (250) to the sensor measurement chamber. The ports (232) are made to fix the sensor assembly body to the final gauge assembly.

Figure 4:
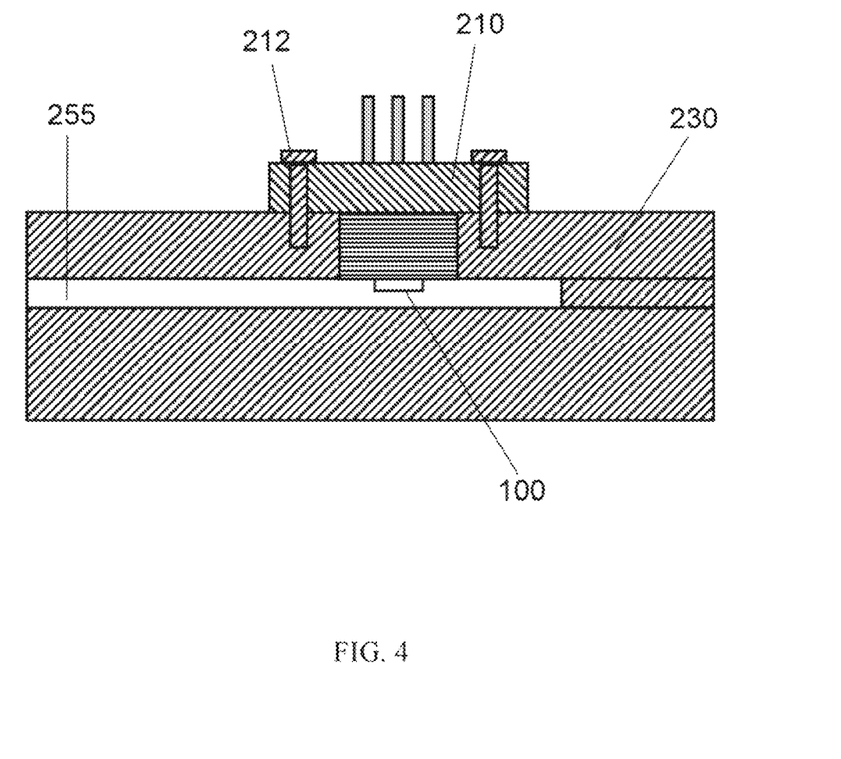
FIG. 4 is the cross-section of the vacuum pressure sensor showing the relative sensor house space and the sensor chip position.

FIG. 4 shows the preferred cross-section of the measurement chamber (255). Since the mean free path of a specific gas is inversely proportional to the pressure value, in the high vacuum regime, the mean free path is often longer than the defined space dimension. Therefore, to boost the measurement sensitivity or the probability of molecular interaction, it is desired to confine the sensor chip within a dimension as small as possible. On the other hand, in the high to ultrahigh vacuum, the changes in thermal conductivity data are null, the thermal convection detection will prefer to have enhanced molecular directional mobility. Hence, the preferred measurement chamber will be in an elongated yet low profiled design with one dead-end as shown in FIG. 4. The distance from the surface of the sensor chip (100) shall be close to the dimension of the thermistor or within 1000 μm, while the dimension of the channel from the sensor chip edge to the exit shall be at least 5 times of the sensor chip dimension that is within 1.5 to 10 mm in length.

Figure 5:
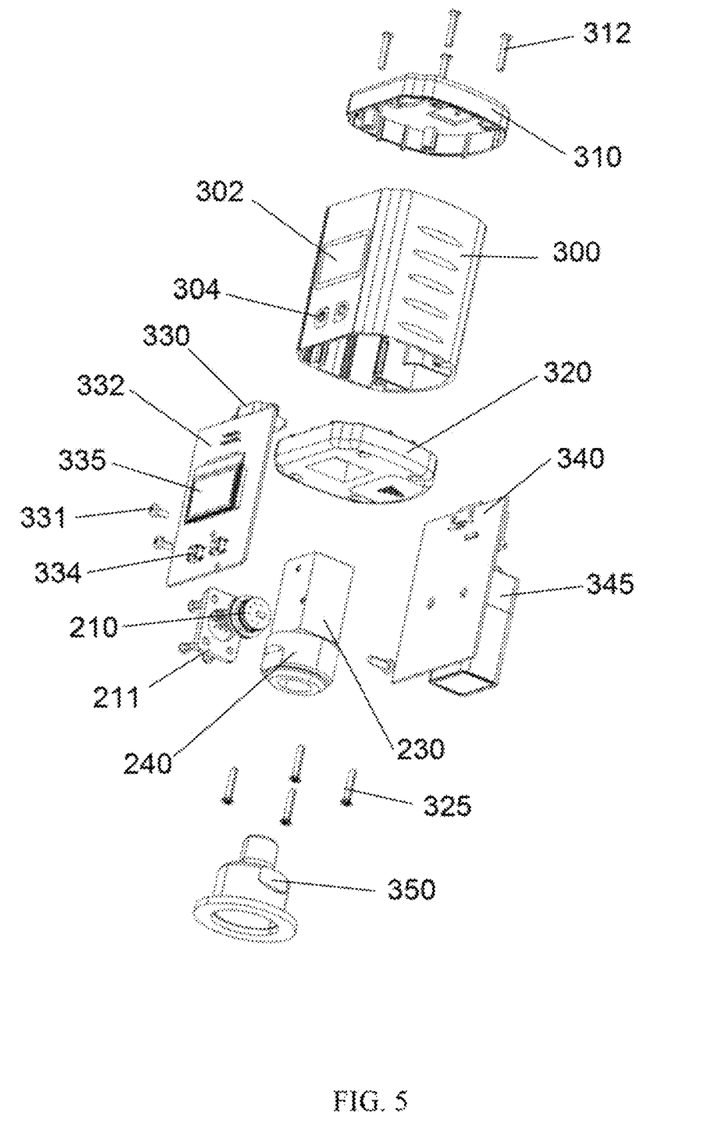
FIG. 5 shows the explosive graph of the final vacuum gauge assembly.

The structure of the complete vacuum gauge with the vacuum sensor having the full dynamic range from ambient to ultrahigh vacuum is shown by the explosive view of the product in FIG. 5. The sensor attached to the feedthrough (210) is sealed with a copper gasket and a fixture (211) to the sensor assembly body (230). The complete unit together with the printed circuitry board having the control electronics (332), the power supply printed circuitry board (340), and an battery pack (345) are housed by the metal enclosure (300) which is further enclosed with the top cover (310) via screws (312) and bottom cover (320) via screws (325). The battery pack is designed for use as a standalone handheld device for low vacuum measurement applications. The material of the enclosure is preferred to be made of anodized aluminum alloy or stainless steel. On the printed circuitry board with the control electronics (332), a local display (335) is preferred to be an organic light-emitting diode (OLED) that provides a clear display even under the strong environment lighting. It will be placed at the position of a transparent window (302) in the enclosure (300), and the window materials can be either glass or plastics. The display and the window can be optional in the applications as for many of the vacuum equipment the vacuum gauge is used to control the pumping and process that will be most preferably via the digital data interface and the display will not be required. The electrical interface (330) opts with any industrial standard protocols. The keyboard (334) on the printed circuitry board of the control electronics and their access (304) on the enclosure is used to set the control point where the pump or the process can be triggered for the desired actions. The printed circuitry board of the control electronics is fixed via screws (331) to the sensor assembly body (230). The connector (240) provides a flexible port for mechanical interfaces. The example shown in the figure is a tri-clamp mechanical interface (350) which is engaged to the port (240) via a threaded connection.

Figure 6:
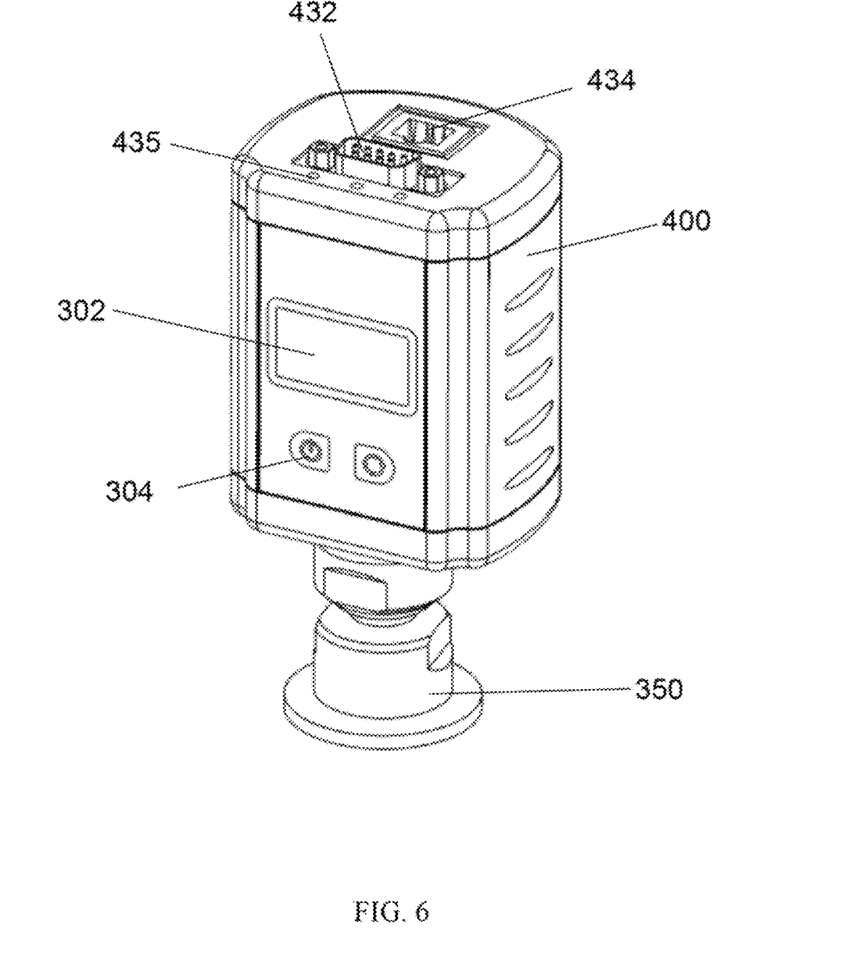
FIG. 6 is the final assembled vacuum gauge.

FIG. 6 shows the assembled final product which is constituent of the assembled vacuum gauge enclosure (400) having the sensor and all electronics and measurement chamber, the exchangeable mechanical interface (350), the electrical interface (432 and 434) made typically of Modbus, Fieldbus, DeviceNet, ProfiBus or other industry-standard protocols. An optional wireless module such as LoRa, NB-IoT, or Bluetooth LE or other type modules is also a desired one for the remote data applications. The electrical interface will also provide the power supply in particular when the remote data communication is enforced. The LED lights (435) will provide visual operational statuses such as setpoints, error codes, and other user-defined functions. The display (302) will provide the digital readings of the measured vacuum values, digital error codes, and setpoint values and other operational data specified by the user. The display will be optional for equipment users but mandatory for handheld devices. The keyboard (304) includes functions such as power on/off, setpoints, set alarm, change vacuum units, check the status, and other user-defined functions.

The invention claimed is:

1. A vacuum gauge with an extended dynamic measurement range from ambient to an ultrahigh vacuum comprising:
   a micromachined thermal vacuum sensor on a silicon substrate, wherein the micromachined thermal vacuum sensor is utilizing thermal sensing principles to measure an extended vacuum level from ambient to an ultrahigh vacuum higher than $10^{-8}$ Torr and is composed of three thermistors and one thermopile on a suspending membrane structure with a underneath silicon bulk etched cavity, wherein first and second thermistors of the three thermistors are thermally isolated from each other by open windows on the suspending membrane structure, wherein third thermistor is located very close to the thermopile with no open window in-between, and the third thermistor is made of selected materials with high emissivity property, wherein another thermistor located on a non-suspending membrane region is utilized to measure a temperature of the silicon substrate;
   a measurement chamber which is designed as an elongated and low profiled flow channel with one dead end;
   a control electronics circuit which is used to drive and control the micromachined thermal vacuum sensor and collected measured electrical signals from the micromachined thermal vacuum sensor;
   a feedthrough which is used to connect the micromachined thermal vacuum sensor to an external connector with a vacuum seal;
   a power pack which is used to power the vacuum gauge independently with no need of an external power source;
   a tri-clamp mechanical interface which is used to connect to a vacuum chamber for measurement; and
   a housing enclosure which provides an accommodating space for all components of the vacuum gauge except the mechanical connector;
   wherein for vacuum level from ambient to low vacuum level of 50 torr, thermal conductivity measurement from the first and the second thermistors plays a major role, wherein heating power is applied to the first thermistor and the second thermistor with two different constant power level respectively, an applied voltage on the thermistor is a direct measurement to the vacuum level;
   wherein for vacuum level from 50 torr to mid-$10^{-8}$ torr, thermal conductivity measurement and thermal convection rate measurement are combined together to perform operation, wherein a time-of-flight mode that a modulated heat-wave is applied to the first thermistor and an elapsed time of the heat-wave recorded at the second thermistor is a direct measurement for the thermal convention rate;
   wherein for ultra-high vacuum level, the vacuum measurement is realized by a measurement of thermal radiation, which is performed by the third thermistor and the thermopile, wherein the thermopile is used to measurement the emissivity of the heater third thermistor.

2. The vacuum gauge with an extended dynamic measurement range from ambient to an ultrahigh vacuum of claim 1 wherein
   the three thermistors on the membrane suspending structure and the fourth thermistor on the non-suspending membrane region are made of materials selected from a group including platinum, tungsten, nickel, and polycrystalline silicon, each thermistor has a thickness ranging from 100 to 500 nm, the distance from the open windows to the first and second thermistors is within 5 μm.

3. The vacuum gauge with an extended dynamic measurement range from ambient to an ultrahigh vacuum of claim 1 wherein
   the thermal conductivity measurement is not related to gas varieties, the dependence of thermal conductivity for various gases is removed by simultaneously acquired and registered thermal conductivity for a specific gas under measurement by applying heating power to the first thermistor and the second thermistor with two different constant power level respectively.

4. The vacuum gauge with an extended dynamic measurement range from ambient to an ultrahigh vacuum of claim 1 wherein
   the third thermistor with a high emissivity coefficient on the micromachined vacuum sensor is made of tungsten, and the thermopile is made of materials with a high Seebeck coefficient; the third thermistor is powered at high power while the thermopile next to it measures a temperature change that is correlated to the ultrahigh vacuum level.

5. The vacuum gauge with an extended dynamic measurement range from ambient to an ultrahigh vacuum of claim 1 wherein
   the suspending membrane structure of the micromachined vacuum sensor is made of highly thermal isolation materials of polyimide or parylene, in some cases for process compatibility, silicon nitride stacked with silicon oxide is used, the membrane thickness are ranged from 500 nm to 5000 nm.

6. The vacuum gauge with an extended dynamic measurement range from ambient to an ultrahigh vacuum of claim 1 wherein
   a passivation layer deposited on top of the micromachined thermal vacuum sensor is made of thermally conductive materials of silicon nitride or silicon carbide with a thickness ranged from 50 to 500 nm.

7. The vacuum gauge with an extended dynamic measurement range from ambient to an ultrahigh vacuum of claim 1 wherein the silicon bulk etched cavity underneath the suspending membrane structure is used to provide higher thermal isolation to achieve higher sensitivity and accuracy.

8. The vacuum gauge with an extended dynamic measurement range from ambient to an ultrahigh vacuum of claim 1 wherein the measurement chamber of the vacuum gauge is used to host the micromachined vacuum sensor, the measurement chamber is made of stainless steel and isolated with non-outgassing materials of glass or ceramics, the distance between surface of the micromachined vacuum sensor and the measurement chamber is within 1000 μm, distance of the micromachined vacuum sensor edge to an exit of the flow channel is within 1.5 to 10 mm.

9. The vacuum gauge with an extended dynamic measurement range from ambient to an ultrahigh vacuum of claim 1 wherein the thermistors on the micromachined thermal vacuum sensor are aligned to a perpendicular direction of the flow channel for a best performance in measurement of the thermal convection.

\* \* \* \* \*